No. 879,303. PATENTED FEB. 18, 1908.
E. D. O'BRIEN & M. E. O'CONNELL.
AUTOMATIC FOLDING VEHICLE DOOR.
APPLICATION FILED APR. 10, 1907.
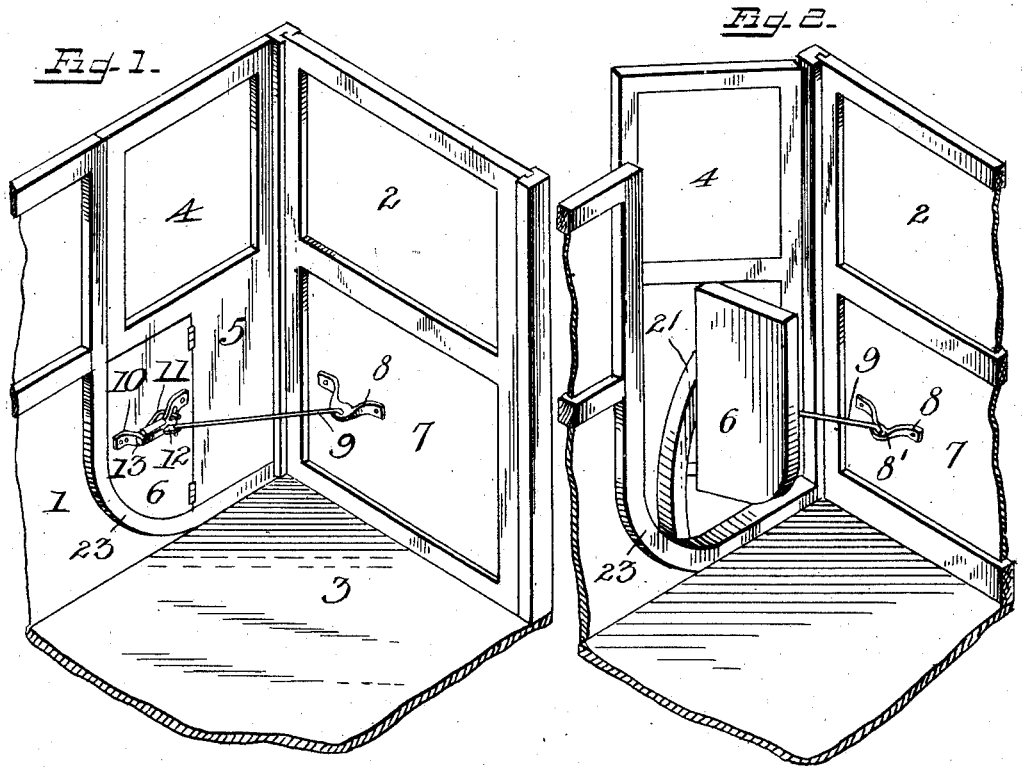
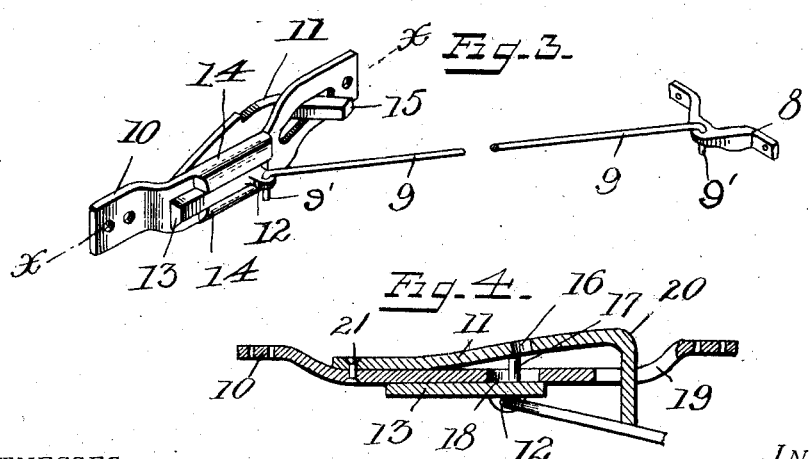
WITNESSES:
INVENTORS
Edward D. O'Brien,
Martin E. O'Connell.
BY
Jerry A. Mathews
Attorney

UNITED STATES PATENT OFFICE.

EDWARD D. O'BRIEN AND MARTIN E. O'CONNELL, OF TERRE HAUTE, INDIANA.

AUTOMATIC FOLDING VEHICLE-DOOR.

No. 879,303.　　　　Specification of Letters Patent.　　　　Patented Feb. 18, 1908.

Application filed April 10, 1907. Serial No. 367,325.

*To all whom it may concern:*

Be it known that we, EDWARD D. O'BRIEN and MARTIN E. O'CONNELL, citizens of the United States, residing at Terre Haute, in the county of Vigo and State of Indiana, have invented a new and useful Automatic Folding Vehicle-Door; and we do hereby declare that the following is a full, clear, and exact description of the invention, which will enable others skilled in the art to which it appertains to make and use the same.

This invention relates to improvements in carriage or similar vehicle doors, and has special reference to doors wherein the same may be opened with the vehicle wheels in any position.

The object is to provide a vehicle door having means withdrawing and holding a section from engagement with the vehicle wheels.

The invention consists of the construction and operation as more particularly pointed out in the specification and claims.

In the accompanying drawing forming part of this specification like reference characters designate the same parts in all of the figures.

Figure 1 is a perspective view, partly broken away, of a corner inside a vehicle, showing the door with my invention applied, the door being closed. Fig. 2 is a similar view to Fig. 1, but with the door open, Fig. 3 is a perspective view of the operating parts of my invention detached from the vehicle, and Fig. 4 is a sectional view of a part of Fig. 3 taken on the line *x—x*.

1 represents the side wall, 2 the front wall, and 3 the floor of a vehicle.

A door 4 is hung by any suitable hinges. The lower half of the door 4 is divided into two sections 5 and 6, the section 6 being hinged to swing horizontally on the section 5.

Secured to the lower part of the front wall of the vehicle is a bracket 8 provided with an eye 8' to receive the hooked end 9' of the rod 9.

Secured to the hinged section 6 is a bracket 10 having formed integral therewith lugs 14. The inner edges of the lugs 14 are beveled forming a slide-way to receive the block 13 whose edges are also beveled.

To the rear face of the bracket 10 is riveted at 21 a spring 11 extending toward the opposite end of the bracket and bent at right angles at 20 and passing through a slot 19 in the aforesaid bracket.

Cast integral with the sliding block 13 and projecting through a slot 18 in the bracket 10 is a pin 17. In the spring 11 is a perforation 16.

On the front face of the sliding block 13 is a lug 12 provided with an eye to receive the other hooked end of the rod 9.

The operation is as follows: When the door is to be opened the same is pushed outward. The block 13 slides between the lugs 14 until the pin 17 is opposite the opening 16 in the spring 11. The spring 11 moves forward, the opening 16 receiving the pin 17, thus locking the block 13 to the bracket 10. On further pressure on the door 4 the section 6 folds inwardly allowing the vehicle door to stand perpendicular to the side of the vehicle no matter in what position the front wheels may be.

Upon pulling the door closed the section 6 moves out to meet the rest of the door. When the door is entirely closed the rod 9 engages the end 15 of the spring 11 forcing the same backward through the opening 19. The pin 17 is thus released from the opening 16 and the block 13 allowed to slide back.

From the construction it will be seen that the fact that the block 13 is released from the spring 11 allows the section 6 to be forced tightly against the frame of the doorway. Otherwise, were the block rigid with the section 6, the rod 9 would be liable to bend and render the device inoperative and useless.

Having described our invention, what we claim and desire to secure by Letters Patent is 1. A vehicle door having a hinged section, a bracket secured to the said section, a second bracket secured to the vehicle, and a slidable means connecting said brackets adapted to be locked to said first named bracket.

2. A vehicle door having a hinged section, a bracket secured to the inner face of said section, a second bracket secured to one of the inner walls of the vehicle, and pivotal and slidable means connecting said brackets, said slidable means adapted to be engaged and held by said first named bracket for operating said section.

3. A vehicle door having a hinged section, a bracket secured to the inner face of said section, lugs formed on said bracket, a block adapted to slide between said lugs and carrying a projection, a second bracket secured to one of the inner walls of the vehicle, and means connecting said block and said second bracket for operating said section said means adapted to engage said projection.

4. A vehicle door having a hinged section, a bracket secured to the inner face of the section, lugs formed on said bracket, a block adapted to slide between said lugs, a perforated lug formed on said block, a second bracket secured to the inner side of the vehicle and having a perforated lug formed thereon, and a rod having hooked ends said ends adapted to enter the perforated lugs.

5. A vehicle door having a hinged section, a bracket, having integral lugs, secured to said section, a block adapted to slide between said lugs, a pin formed integral with said block, a slot in said bracket adapted to receive said pin, a spring secured to said bracket and having a perforation therein, and means for engaging and disengaging said pin and perforation.

6. A vehicle door having a hinged section, a bracket secured to said section and having a plurality of slots formed therein, lugs on said bracket, a block sliding between said lugs and having a perforated lug formed thereon, a spring secured to rear face of said bracket, and having a perforation midway its length, a pin formed on said block and projecting through one of the said slots, said spring having its free end bent and extending through the other of said slots, a second bracket secured to the wall of the vehicle, and a rod pivotally secured to the second bracket and the sliding block whereby when the vehicle door is forced outwardly said block will slide between said lugs causing the said pin to enter the perforation in said spring.

In testimony that we claim the foregoing as our own, we have hereunto subscribed our names in the presence of two witnesses.

EDWARD D. O'BRIEN.
MARTIN E. O'CONNELL.

Witnesses:
WILLIAM T. KLIPPERT,
SYDNEY B. DAVIS.